March 27, 1934.   H. S. COLE, JR., ET AL   1,953,043
RECOVERY OF GASOLINE FROM NATURAL GAS
Filed Oct. 24, 1930
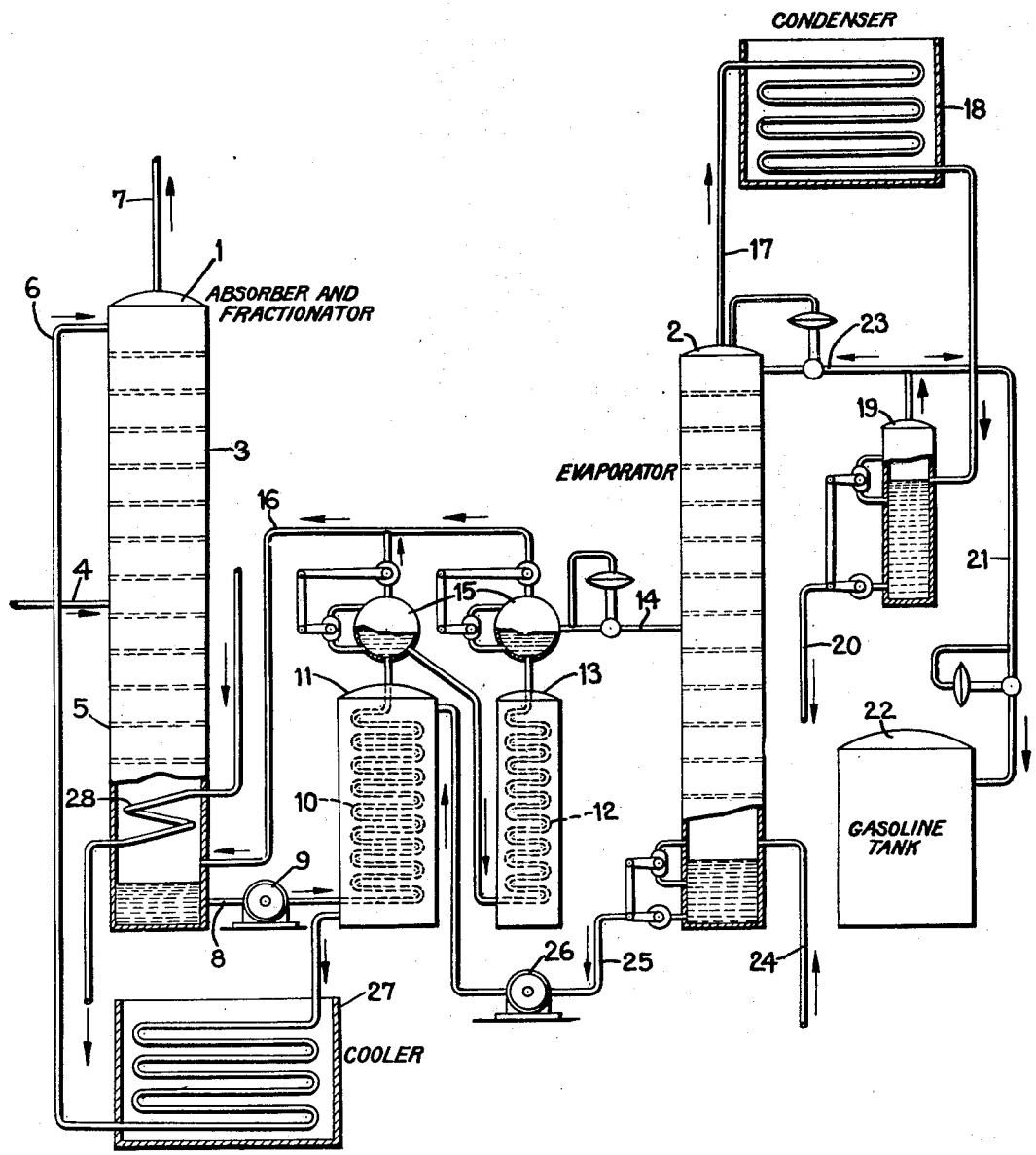
Howard S. Cole, Jr.
Edwin R. Cox
INVENTORS
BY ATTORNEY
R. J. Dearborn

UNITED STATES PATENT OFFICE 1,953,043

RECOVERY OF GASOLINE FROM NATURAL GAS

Howard S. Cole, Jr., Pasadena, and Edwin R. Cox, Los Angeles, Calif., assignors to The Texas Company, New York, N. Y., a corporation of Delaware Application October 24, 1930, Serial No. 490,850

4 Claims. (Cl. 196—8)

This invention relates to the recovery of gasoline from natural gas by absorption in a liquid absorption medium and has to do particularly with the fractionation of the absorbed constituents in the presence of the liquid absorbent and the elimination of undesired constituents from the absorbent prior to the separation of the desired absorbed gasoline.

In the usual practice of recovering gasoline from natural gas, a relatively wide range of hydrocarbons is absorbed in the absorption medium in order to insure the loss of no desired gasoline components in the dry gas leaving the absorber. The absorbed hydrocarbons accordingly contain a substantial amount of constituents more volatile than the desired gasoline and these undesirable constituents are then removed in order to obtain a stable gasoline. Heretofore, the wild gases and vapors have been distilled from the absorbent during the distillation of the gasoline fraction. As a result, it has been necessary to vent gases from the evaporator during the distillation in order to maintain a constant pressure on the system. Often these gases carry with them considerable amounts of gasoline vapors, making it necessary to compress them in order to recover the gasoline content. The gasoline distillate from the evaporator, even though a considerable quantity of gases were vented from the evaporator, usually contains a large quantity of wild gases, making it necessary to retreat the gasoline by weathering or in a stabilizer to obtain a stable product.

According to the present invention the same result is obtained as heretofore, but in the process of the invention the wild gases and vapors that are undesirable in the finished gasoline are eliminated from the absorbent liquid in the initial stages of the operation prior to the distillation of the desired gasoline components from the absorbent. In this way, the undesirable constituents are separated from the gasoline and removed from the system along with the dry gases issuing from the absorber. Consequently, the rich absorbent contains only the desired gasoline fractions which may be evaporated from the absorbent to produce stable gasoline without further retreating as has been done in former practice. The absorption of the gasoline and separation of undesirable constituents may be accomplished at the beginning of the operation in such a way that the absorption and fractionating may be done in a single step if desired, thereby making it possible to combine the absorber and fractionating column in a single compact piece of apparatus.

Besides the advantages of simplicity and compactness of the apparatus, a substantial saving in operating costs may be realized. Thus it will be observed that the separation and elimination of volatile gases and vapors at the beginning of the operation reduces the volume of undesired components that have been unnecessarily recirculated through the system in prior methods. The result is that no power is required to compress the gases escaping from the final evaporator to recover the gasoline content; no redistillation of the unstable gasoline in a stabilizer to remove the wild gases is necessary; and a substantial reduction in cooling water required to condense only the stable gasoline is noted. Other advantages will be apparent as the apparatus and operation of the process are described. The accompanying drawing is an elevation partly in section of an apparatus suitable for carrying out the process of the invention.

Referring to the drawing, the system comprises essentially a combined absorber and fractionator 1 for absorbing the gasoline and elimination of undesired constituents, and an evaporator 2 for recovering a stable gasoline from the absorbent liquid. The combined absorber and fractionator comprises an absorber 3, above the inlet for wet gas, 4, which is superimposed on a fractionating column 5. The lean absorbent oil is introduced to the top of the absorber through the line 6. Dry gases, stripped of the gasoline content, are released from the top of the absorber through the pipe 7. The rich absorbent liquid is drawn from the bottom of the fractionating column 5 through the pipe 8 and forced by the pump 9 through the coil 10 located in a heat exchanger 11, thence through the coil 12, located in preheater 13 and finally introduced into the evaporator 2 through the pipe 14. At the exit of each of the coils 10 and 12, are located vents 15 for releasing vapors generated as the rich absorbent is heated therein. The vapors from the vents are returned through the line 16 to the bottom of the fractionating column 5.

The evaporator 2 is of the conventional type for separating gasoline from absorbent oil and is equipped for obtaining fractionation in the top thereof so as to separate any absorbent liquid from the vapors. The gasoline vapors are passed from the top of the evaporator through the line 17 to the condenser 18, where they are liquefied and drained to the receiver 19. Water separating out in the receiver may be drawn through line 20. The condensate is passed through the line 21 to the gasoline tank 22. A portion of the condensate may be passed through the line 23 to the top of evaporator as a reflux medium. Steam is introduced to the bottom of the evaporator through the pipe 24. The lean absorbent oil, stripped of its gasoline content, is drawn from the bottom of the evaporator through the pipe 25 and forced by the pump 26 through the heat exchanger 11 in heat exchange with the rich absorbent from the fractionating column. The partially cooled absorbent from heat exchanger 11 is then passed through the cooler 27 to further cool the liquid before returning it through line 6 to the absorber.

Attention is called to the steam coil 28 located in the lower portion of the fractionating column 5. This steam coil is to heat the absorbent in the fractionating column and maintain a temperature gradient between the bottom of the column and the point of entrance of the wet gas through the line 4. This coil may be conveniently governed by a thermostat (not shown) to automatically maintain a certain temperature. It is to be noted that the means for heating the fractionating column 5 provides a novel arrangement for a preliminary distillation and fractionation of the absorbent oil directly following the exit of the oil from the absorber; ordinarily, the distillation and fractionation of light constituents from the absorbent takes place between the heat exchangers and the final evaporator.

While the absorber and fractionator are combined in the drawing as a single element, the invention contemplates a structure whereby the absorber 3 and the fractionating column 5 may be separate units. Also heat exchanger 11 may be divided into a number of elements without departing from the spirit of the invention. Furthermore, in some cases it may be possible to eliminate the vents 15 and remove all the undesirable fractions in the fractionating column 5.

In practicing the invention with an apparatus such as the one shown in the drawing, natural gas containing a substantial amount of gasoline vapors is passed into the bottom of the absorber 3 which is preferably maintained under about 30 lbs. per sq. in. working pressure. As the gas rises in the absorber and comes into intimate contact with the cool absorbent oil introduced through the pipe 6, substantially all the gasoline vapors are absorbed and a dry gas containing only constituents lighter than butane is released from the top of the absorber. A rich absorbent oil containing the gasoline fractions and a substantial amount of light combustible hydrocarbons flows from the absorber into the top of the fractionating column. Hence it will be observed that the fractionation taking place in the fractionating column is in the presence of the absorbent oil. The undesired fractions are driven off from the absorbent oil by the heat applied to the lower section of the column. The undesired fractions driven off will necessarily carry with them a considerable content of desired fractions. Therefore the vapors which reach the wet gas inlet 4 are mixed with the entering gas and the desired fractions are reabsorbed in the absorbent oil since the oil to gas ratio which is necessary to recover substantially all of any component is independent of the richness of the gas.

The partially denuded absorbent oil is pumped by the pump 9 from the bottom of the fractionating column through the heat exchanger 11, where it receives a considerable amount of heat from the hot lean absorbent oil passing therethrough. The rich oil is further heated in a preheater 13, preferably of the steam type, in which the oil is raised to approximately the desired distillation temperature before introducing it into the evaporator. A substantial amount of light vapors are usually released from the vents 15 and passed to the bottom of the fractionating column through the line 16. The vapors passing through the line 16 consist of the last traces of hydrocarbons more volatile than gasoline mixed with a substantial amount of the desired gasoline fractions. The gasoline fractions are reabsorbed in the absorbent oil and gases lighter than gasoline are separated and pass out with the dry gas from the absorber. Consequently the absorbent oil entering the evaporator 2 through the line 14 contains only the desired gasoline constituents.

The evaporator is the common type ordinarily used for the distillation of gasoline from absorbent oil. This evaporator is preferably maintained under a substantially lower pressure than that maintained on the absorber and the fractionating column. Steam may be introduced into the evaporator through the line 24 to aid the distillation, but the amount of steam is usually small, since the evaporator is maintained under a reduced superatmospheric pressure. The vapors passing from the top of the evaporator through the line 17 contain the gasoline vapors and steam which are condensed in the condenser 18. Condensate collecting in receiver 19 is separated into gasoline distillate and water, the latter being drawn off through the line 20. A portion of the distillate is preferably returned to the top of the evaporator as a reflux to aid in controlling the end point of the gasoline and the remainder passed to the run-down tank 22. A lean absorbent oil ranging in temperature from about 200 to 400° F. is drawn from the bottom of the evaporator and passed in heat exchange with the rich absorbent oil in the exchanger 11. In this exchanger, the lean oil is usually reduced in temperature from about 100 to 200° F. and then cooled to substantially below 100° F. in the cooler 27 and the cooled oil is then returned to the top of the absorber.

While a complete system for carrying out the invention has been described, modifications in the structure and uses of various parts of the apparatus may be made without departing from the spirit of the invention. Therefore, only such limitations are to be imposed as are indicated in the appended claims.

We claim:

1. The method of recovering gasoline from natural gas which comprises charging an absorbent liquid downwardly through a combined absorption and fractionation zone, introducing natural gas at an intermediate portion of said combined zone to pass countercurrent and in direct contact with said absorbent to absorb the gasoline constituents in said absorbent, heating the lower portion of said zone to vaporize and to fractionate the more volatile constituents absorbed by said absorbent liquid, withdrawing rich absorbent from the lower portion of said zone, subjecting said rich absorbent to partial distillation to separate gases and light vapors from the desired gasoline, returning said gases and light vapors to the lower portion of said combined zone, withdrawing residual gases and vapors from the top of said combined zone and finally recovering by distillation the desired gasoline from the absorbent after the separation of the undesired gases and light vapors therefrom.

2. The method according to claim 1 in which the partial distillation operation is carried out in a zone of heat exchange with hot lean absorbent from the final recovery distillation operation and a preheating step.

3. An apparatus for recovering gasoline from natural gas comprising a combined absorber and fractionating tower, means for introducing natural gas into an intermediate portion of said tower, means for heating the lower portion of said tower, a heat exchanger, means for venting off vapors from said heat exchanger, means for passing said vapors to the lower portion of said tower, an evaporator for vaporizing the gasoline from the absorbent oil, means for passing rich absorbent oil from the bottom of said tower through said heat exchanger to said evaporator and means for passing lean absorbent from said evaporator through said heat exchanger, in indirect heat exchange with said rich absorbent passing through the exchanger, to the upper portion of said tower.

4. In an apparatus for recovering gasoline from natural gas, the combination of a combined absorber and fractionator, means for introducing natural gas to the intermediate portion of said combined absorber and fractionator, a heating coil in the lower portion of said combined absorber and fractionator to maintain a temperature gradient therein, an evaporator, connections including a preheater between the combined absorber and fractionator and said evaporator, and means for venting vapors from said preheater and conducting the same to the combined absorber and fractionator.

HOWARD S. COLE, Jr.
EDWIN R. COX.